March 7, 1967 D. VON SANDEN 3,308,240

CIRCUIT ARRANGEMENT CONSTRUCTED IN THE MANNER OF A COUPLING MULTIPLE FOR THE CONNECTION OF TIME MULTIPLEX TELEPHONE SYSTEMS

Filed July 17, 1962 2 Sheets-Sheet 1

Inventor:
Dieter von Sanden

By [signature] Atty.

CIRCUIT ARRANGEMENT CONSTRUCTED IN THE MANNER OF A COUPLING MULTIPLE FOR THE CONNECTION OF TIME MULTIPLEX TELEPHONE SYSTEMS

Filed July 17, 1962 2 Sheets-Sheet 2

Inventor:
Dieter von Sanden
By [signature] Atty.

United States Patent Office 3,308,240 Patented Mar. 7, 1967

3,308,240

CIRCUIT ARRANGEMENT CONSTRUCTED IN THE MANNER OF A COUPLING MULTIPLE FOR THE CONNECTION OF TIME MULTIPLEX TELEPHONE SYSTEMS

Dieter von Sanden, Munich-Solln, Germany, assignor to Siemens & Halske Aktiengesellschaft Berlin and Munich, a corporation of Germany Filed July 17, 1962, Ser. No. 210,406
Claims priority, application Germany, July 25, 1961, S 79,976
6 Claims. (Cl. 179—15)

The invention disclosed herein relates to a time multiplex telephone system, and is particularly concerned with a circuit arrangement for time multiplex telephone systems. In such systems, the communications to be exchanged between given subscribers are modulated on impulse sequences which are mutually displaced, thereby permitting multiple utilization of connection paths or channels. Of the known, differently constructed time multiplex telephone systems, only those are here of interest, which are provided with a call- or conversation multiplex line over which are extended calls which are with respect to the subscribers, incoming calls, and which are also provided with a special call- or conversation multiplex line over which are extended calls which are with respect to subscribers involved, outgoing calls.

There is for readily understandable reasons the desire to extend connections between subscriber stations which are part of different telephone systems of this kind. The systems involved may be spatially directly neighboring systems. The maximum number of subscriber stations that may be connected to one and the same system or exchange is in the case of time multiplex telephone systems for sundry technical reasons, limited. When there are a great many subscribers, for example, 10,000 subscribers, it will be necessary to provide instead of a single large system or exchange, several spatially directly neighboring systems or exchanges with smaller capacity, which cooperate mutually over a given circuit arrangement.

The invention shows a way for particularly advantageously constructing such circuit arrangements, and thereby obtaining definite savings.

There are already circuit arrangements known (see German patent DAS 1,001,338, to Lionel Ray Frank Harris, January 24, 1957, especially FIG. 2; and British Patent 814,183, to George Clifford Hartley, published June 3, 1959, FIG. 3) over which call multiplex lines engaged in incoming calls can as required be connected with call multiplex lines engaged in outgoing calls, so as to effect communication between subscribers having access to these call multiplex lines. Groups of subscribers (subscriber stations) have thereby access to a pair of cooperating call multiplex lines, one of the lines of such pair transmitting communication in incoming direction and the other line of the pair transmitting communication in outgoing direction. Subscriber stations involved in calls are for this purpose by means of call switches periodically impulse-wise connected with the respective call multiplex lines. There are further switches provided in such circuit arrangements, to effect the indicated connection between call multiplex lines. The number of such further switches is as great as the square of the numbers of pairs of call multiplex lines. This means that the number of such further switches is very great, particularly when there are many pairs of call multiplex lines. A corresponding expenditure is warranted only in the presence of a volume of traffic which is sufficiently great for an efficient utilization of the switches.

The invention proposes another way for effecting connections between subscriber stations of different subscriber groups or different communication systems, respectively. The circuit arrangement which is provided therefor permits adapting the number of switches to the volume of traffic actually to be expected between subscribers, thereby avoiding unnecessary expenditure. Further switches are suitably provided over which calls can be extended to multiplex lines of communication systems having instead of subscriber stations, lines leading to other exchanges, for handling outgoing calls, or lines coming from such other stations, for handling incoming calls.

The invention is accordingly concerned with a circuit arrangement over which is conducted the traffic of a plurality of time multiplex telephone systems, such system having a call multiplex line over which are extended calls directed to subscriber stations (incoming calls) and also a call multiplex line over which are extended calls from subscriber stations (outgoing calls), the subscriber stations of the respective communication systems, which are involved in calls, being by means of call switches periodically impulse-wise connected to the corresponding call multiplex lines. The characteristic feature of the circuit arrangement resides in that it is constructed in the manner of a cross-wire or coupling multiple to the line or row conductors of which are connected individual call multiplex lines for outgoing and incoming calls, respectively, so as to effect, over the column conductors, calls within and between the time multiplex communication systems, by interconnecting given call multiplex lines for outgoing calls with call multiplex lines for incoming calls, such interconnections being effected with the aid of coupling point contacts connected with the respective column conductors and line or row conductors at crossing points thereof. Further column conductors are provided which respectively cross only line conductors connected with call multiplex lines for outgoing traffic, to which are connected multiplex lines of time multiplex communication systems with lines leading to other exchanges (instead of to subscriber stations), and still further column conductors are provided which respectively cross only line conductors connected with call multiplex lines for incoming traffic, such latter call multiplex lines being connected with time multiplex communication systems with lines coming from other exchanges (instead of coming from subscriber stations), thus making it possible to effect, over these further column conductors and over coupling point contacts connected with the corresponding column conductors and line conductors, calls going out to other exchanges or coming in from other exchanges, respectively.

The number of coupling point contacts over which is effected the traffic within and between the time multiplex communication systems, can be adapted to the given volume of traffic. It is for this purpose necessary to provide only a number of column conductors so that the number of crossing points between line conductors and column conductors corresponds to the number of required coupling point contacts. A saving is effected, as compared with the initially noted known circuit arrangements, for example, when the number of column conductors is less than half the number of pairs of call multiplex lines. The circuit arrangement according to the invention provides at the same time suitable points, namely, the crossing points between the line conductors and the further column conductors, at which can be arranged coupling point contacts for effecting calls going respectively to and coming from other exchanges. The circuit arrangement according to the invention is accordingly adapted to satisfy all possibly occurring traffic requirements.

Further details of the invention will appear from the description of the system which is rendered below with reference to the accompanying drawings.

Figure 1:
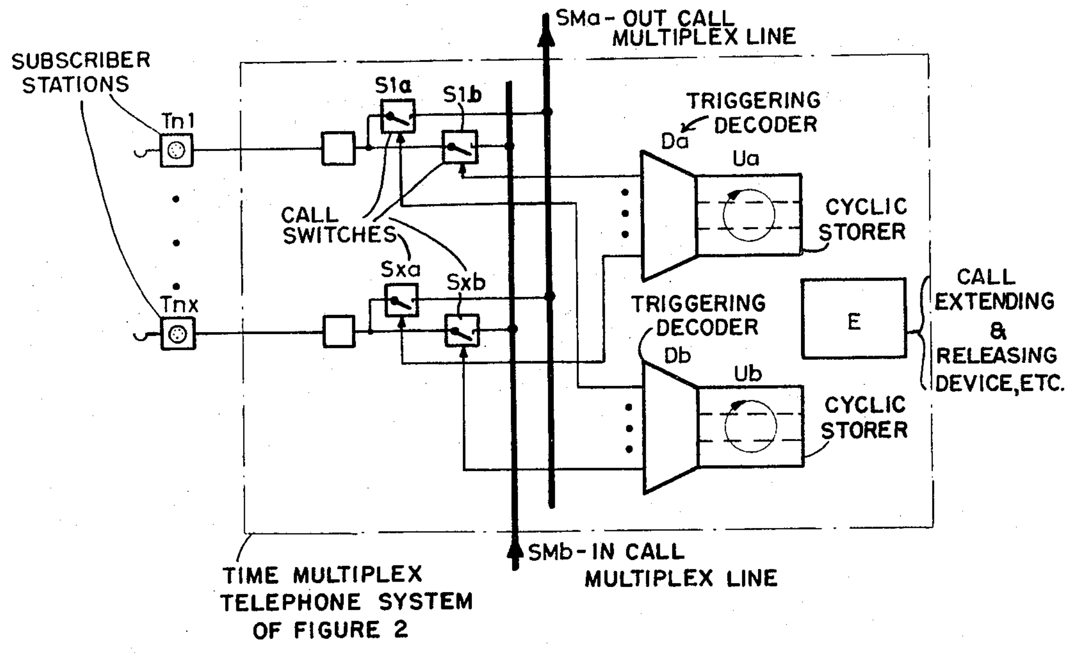
FIG. 1 shows in schematic manner an example of a time multiplex telephone system of the type to which the invention pertains, only parts thereof being indicated the knowledge of which is required for an understanding of the invention.

To the system shown partially in FIG. 1, are connected subscribed stations T*n*1 . . . T*nx* which can be respectively connected with the call multiplex lines SM*a* and SM*b* by means of call switches S1*a* . . . S*xa* and S1*b* . . . S*xb*. The call switches are controlled by control pulses which are supplied by cyclic storers, two cyclic storers being used here which are indicated by U*a* and U*b*. In the cyclic storer U*a* are cycled in coded form the call numbers of subscriber stations involved in outgoing calls and in the cyclic storer U*b* are in similar manner cycled the call number of stations involved in incoming calls. The call numbers which are present in coded form will be referred to as addresses. The addresses which are associated with a given connection have the same cycling phase and therefore are simultaneously supplied at the outputs of the cyclic storers, to which are respectively connected the so-called triggering decoders D*a* and D*b*. Each triggering decoder has as many outputs as there are subscriber stations, each individual output being assigned to a definite subscriber station. Accordingly, to each subscriber station are assigned two call switches, one of such call switches being connected with an output of the triggering decoder D*a* and the other being connected with an output of the triggering decoder D*b*. Thus, the call switches **S1*a* and S1*b*** are, for example, assigned to the subscriber station T*n*1, the call switch **S1*a*** being connected with the triggering decoder D*a* and the call switch S1*b* being connected with the triggering decoder D*b*. When the address of a subscriber is supplied to a triggering decoder, an impulse will appear at the output thereof which impulse is assigned to the corresponding subscriber, such impulse being used for the control of the call switch assigned to the respective subscriber. Upon simultaneous appearance of impulses at outputs of the two triggering decoders, which outputs are assigned to two different subscriber stations, the call switches assigned to these subscribers will be temporarily simulltaneously closed, whereby the corresponding stations are, during the closure interval of the call switches, connected to the respective call multiplex lines SM*a* and SM*b*. This is periodically repeated with the cycling phase of the addresses which are being cycled in the cyclic storers. The desired connection between the respective subscriber stations is effected when the two call multiplex lines are at such instants likewise interconnected. The contacts required for effecting the desired connection are, for example, disposed in a manner to be presently described in detail, in the circuit arrangement according to the invention.

There are, in addition to the above described devices, other devices included in the system, especially devices for extending calls and for releasing calls upon completion thereof, these other devices being merely symbolically indicated by the rectangle marked E. They do not play a part in the contemplations which are here of interest and a detailed description thereof is accordingly omitted.

Only one cyclic storer and one multiplex line will be required in the event that devices are used, in the place of subscriber stations, over which are merely conducted outgoing or incoming calls. For example, such devices may be or may involve trunk lines connecting different exchanges, over which transmissions take place in only one direction.

Figure 2:
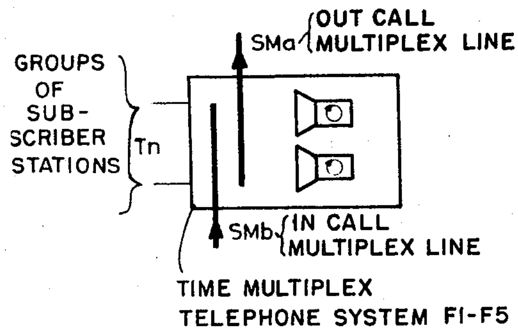
FIG. 2 represents a symbol which is being used in FIG. 3, the latter figure showing the construction of an example of the circuit arrangement according to the invention.
Figure 3:
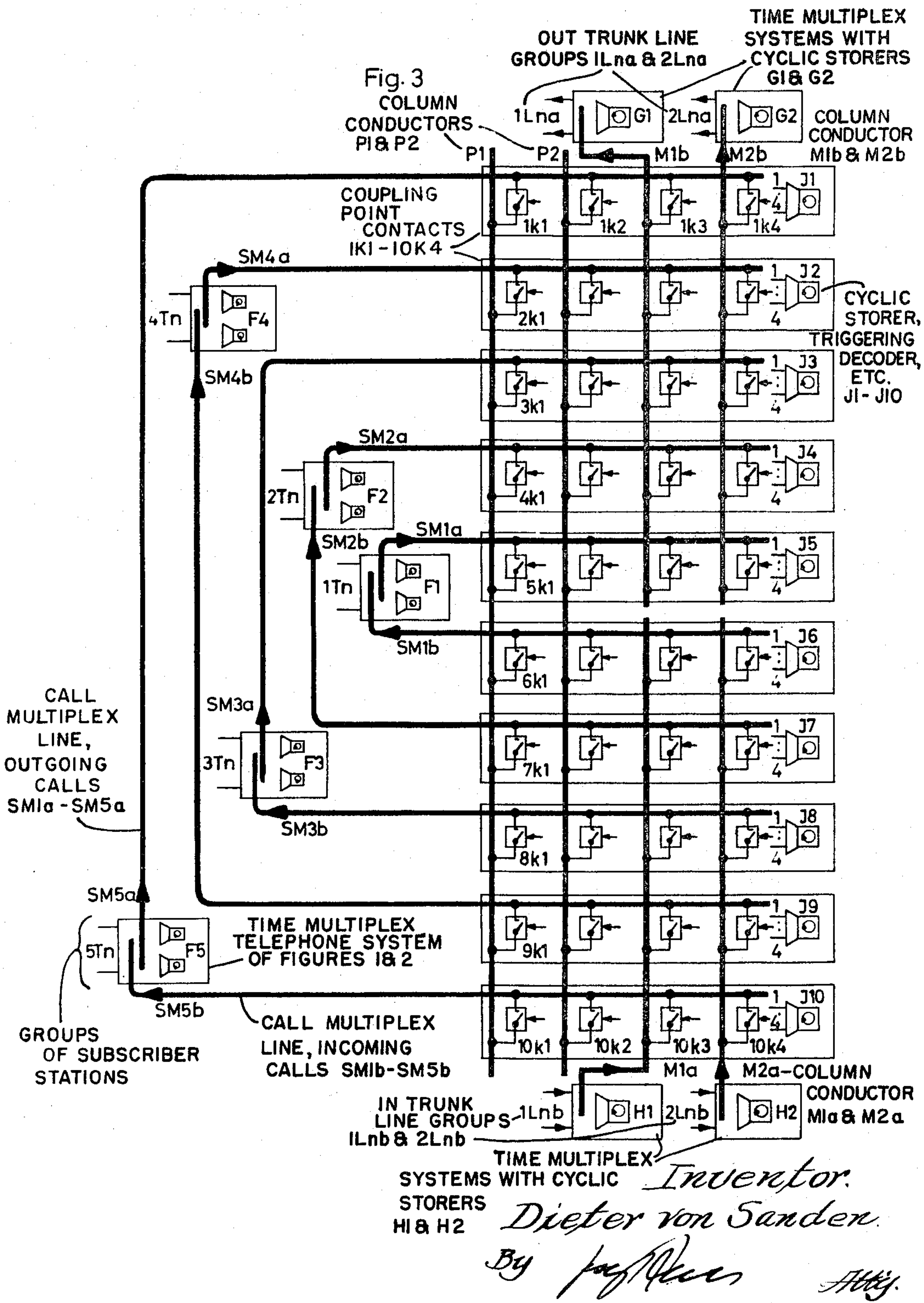

FIG. 2 is a simplified symbolic representation of the communication system indicated within the dot-dash rectangle in FIG. 1. The corresponding symbol is used in FIG. 3, showing the circuit arrangement according to the invention, over which a plurality of time multiplex telephone systems are cooperatively associated.

The construction of the circuit arrangement will now be explained in detail, supplying also information as to further devices which are connected therewith.

As noted before, the circuit arrangement includes a so-called coupling multiple, sometime also referred to as cross-wire field. The term coupling multiple is intended to denote a definite arrangement of contacts which are referred to as coupling point contacts, such contacts being disposed in crossing field fashion in lines and columns and being line-wise and column-wise multiplied. The coupling point contacts **1*k*1 . . . 1*k*4** are arranged along a line of the coupling multiple and are respectively connected each with a terminal of the conductor assigned to the corresponding line. The other terminals of the coupling point contacts are connected with different column conductors disposed in perpendicular crossing relationship with respect to the noted line condutcor.

The coupling point contacts **1*k*1 . . . 10*k*1**, lying along a column conductor, are in analogous manner connected, each with a terminal of the respective column conductor and individually with a terminal of a line conductor disposed in perpendicularly crossing relationship with the corresponding column conductor. The remaining coupling point contacts arranged along the other line and column conductors are similarly circuited wilth respect to such conductors. The manner in which coupling point contacts are connected with the column conductors M1*a*, M2*a*, M1*b* and M2*b*, is somewhat different and will be presently explained. A line conductor can be connected with a column conductor by closing a coupling point contact. Two line conductors can be mutually interconnected over a column conductor, by closing two coupling point contacts connected to one and the same column conductor. Thus, the line conductors which are connected with the call multiplex lines SM1*a*, SM1*b*, can be connected together over the column conductor P1, for example, by closing the coupling point contacts **5*k*1 and 6*k*1**.

As mentioned before, the call multiplex lines of time multiplex telephone systems are individually connected to the respective line conductors. These are the call multiplex lines SM1*a*, SM1*b*, SM2*a*, SM2*b* . . . SM5*a*, SM5*b* of the time multiplex telephone systems F1 . . . F5. To the respective systems are connected groups of subscriber stations the service requirements of which have to be taken care of. The groups of subscriber stations are indicated by **1T*n* . . . 5T*n***. The time multiplex telephone systems for the respective subscriber groups are indicated by symbols corresponding to the symbols shown in FIG. 2, each system comprising two cyclic storers for subscriber addresses and two call multiplex lines.

The above described line conductors are crossed by column conductors P1 and P2. The coupling point contacts **1*k*1 . . . 10*k*1 and 1*k*2 . . . 10*k*2 serve for effecting connections respectively within and between the various time multiplex telephone systems F1 . . . F5. It may be noted at this point that the number of coupling point contacts is less than the square of the number of pairs of call multiplex lines, that is, there are 5 pairs of call multiplex lines while there are only 20 coupling point contacts along the column conductors P1 and P2**.

There shall now be briefly described the manner in which calls are over these coupling point contacts effected between the various time multiplex telephone systems. It shall be assumed, for example, that a subscriber station of the system F4 is to be connected with a station of the system F5. In such a case, the call switch of the involved station in the system F4 is periodically impulse-wise closed, thereby periodically connecting the corresponding subscriber station with the call multiplex line SM4*a* provided for outgoing calls. The control pulse which effects the closure of the call switch has a definite phase position which differs from the phase positions of control pulses assigned to other subscribers involved in outgoing calls in the same telephone system. The coupling point contacts 2*k*1 and 10*k*1 are impulse-wise periodically closed synchronously with the actuation of the call switch assigned to the subscriber station in the system F4. This results in impulse-wise connection of the call multiplex line SM4*a* for outgoing calls, with the call multiplex line SM5*b* for incoming calls, the latter line SM5*b* being connected to the system F5 to which is connected the called subscriber station. The desired telephone connection is here effected owing to the fact that the address of the called subscriber station is cycled in the system F5 so that the control pulse for the call switch of the called party has the same phase position as the pulse which controls the actuation of the call switch assigned to the calling party in the system F4.

It is understood, of course, that several telephone connections may be simultaneously present between two given time multiplex telephone systems, it being merely necessary that the respective control pulses have different phase positions. The corresponding connections may even extend over the same coupling point contacts without entailing mutual interference. Subscribers assigned to other pairs of systems can likewise be operatively connected together at identical times, since such connections are established over other coupling point contacts. Telephone connections can also be maintained at identical times, with the aid of control pulses with the same phase position, provided that they are extended over different column conductors.

The manner in which calls are expedited over the coupling point contacts, within a time multiplex telephone system, has already been described with reference to the system F1. The operations involved are wholly analogous to those which are to be considered in connection with expediting the calls between two time multiplex telephone systems, the difference merely residing in the fact that the two cyclic storers employed and the two call multiplex lines are part of one and the same system. More than two subscriber stations can be connected here pair-wise over the same coupling point contacts, provided that control pulses of different phase position are used for the various connections.

Further column conductors are provided in the circuit arrangement according to the invention, which cross only line conductors connected with call multiplex lines for outgoing calls, namely, the call multiplex lines SM1*a* . . . SM5*a*. Accordingly, these further column conductors cross only half of the call multiplex lines which are provided in the system. These column conductors are connected with multiplex lines of time multiplex systems to which are connected (instead of subscriber stations) trunk lines extending to other exchanges, namely, the systems G1 and G2 with the trunk line groups 1L*na* and 2L*na*. There are in addition provided further column conductors which are only in crossing relationship with line conductors to which are connected call multiplex lines for incoming calls, namely, the call multiplex lines SM1*b* . . . SM5*b*. Accordingly, these latter column conductors cross only the other half of the call multiplex lines provided in the system, such column conductors being connected (instead of with subscriber stations) with multiplex lines of systems to which are connected trunk lines coming from other exchanges, namely, time multiplex systems H1 and H2 with the line groups 1L*nb* and 2L*nb*. Over these further column conductors are maintained calls, by impulse-wise closure of the coupling point contacts disposed along the corresponding column conductors and line conductors, which respectively extend to other exchanges (outgoing calls) or which are received from other exchanges (incoming calls).

A connection between a subscriber of the subscriber group 5T*n* of the system F5 with a line of the line group 2L*na* of the system G2 is maintained over the call multiplex line SM5*a* for outgoing calls, the coupling point contact 1*k*4 and the multiplex line M2*b*. In the systems involved in such a connection, there will be closed, periodically, impulse-wise, a call switch, in a similar manner as described in connection with previously explained calls, and synchronously therewith a coupling point contact, namely, the coupling point contact 1*k*4. A connection between a line of the line group 1L*nb* of the system H1 and a subscriber station of the subscriber group 5T*n* of the system F5 is maintained over the multiplex line M1*a*, the coupling point contact 10*k*3 and the call multiplex line SM5*b* for incoming calls. In such case, the involved call switches and the coupling point contact to be considered, here the coupling point contact 10*k*3, will again be synchronously periodically impulse-wise closed. Connections over the other systems G1, G2, H1 and H2 are analogously maintained.

Figure 4:
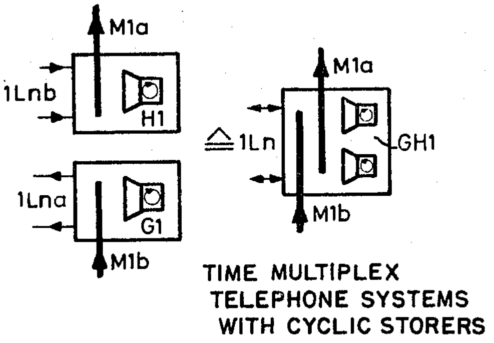
FIG. 4 indicates in schematic representation the manner of combining given time multiplex telephone systems.

It is in some situations desirable to combine in pairs time multiplex systems, such for example as G1 and H1 or G2 and H2, which are provided with exchange trunks instead of with subscriber stations. The systems thus resulting will have a multiplex line for outgoing calls as well as a multiplex line for incoming calls. The exchange trunks connected to such systems (instead of subscriber stations) may then be adapted for two-way operation, that is, for outgoing as well as incoming traffic. Such a combination of two communication systems is schematically shown in FIG. 4. The combination of the systems G1 and H1, each with a cyclic storer and a line or trunk group such as 1L*na* and 1L*nb*, results in the system GH with two cyclic storers and the trunk line group 1L*n*. Each trunk line in the group corresponds to a trunk line of the group 1L*na* and to a trunk line of the group 1L*nb*. The extension of calls from and to a combined system, over the circuit arrangement with the coupling multiplex, shown in FIG. 3, is effected in the manner already described.

To the circuit arrangement shown in FIG. 3 are connected 5 time multiplex systems serving subscriber stations and also 4 other time multiplex systems serving trunk lines. The coupling multiple has 10 lines and four columns, two of the columns being split. The noted numbers of communication systems and of the lines and columns merely indicate examples; they may vary as desired or required.

The coupling point contacts of the coupling multiple may be operatively actuated with the aid of control means corresponding to those employed for the actuation of the call switches. For example, there may be provided special cyclic stores in which code signals, assigned as addresses to the coupling point contacts, are being cycled, such signals serving as control pulses which effect the periodic impulse-wise closure of the respective coupling point contacts. A cyclic storer of this kind may be assigned, for example, to each line conductor of the coupling multiple. This is likewise indicated in FIG. 3, showing devices J1 . . . J10, respectively assigned to the various line conductors, each such device comprising a cyclic storer and a triggering decoder as well as other cooperating parts. The cyclic storer of the device J1 has as many outputs, indicated at 1 . . . 4, as there are coupling point contacts on the corresponding line conductor, such contacts being controlled over the respective outputs. Different coupling point contacts disposed along one and the same line conductor are not simultaneously actuated, thus avoiding connecting different calls together. Accordingly, one cyclic storer suffices for controlling the actuation of coupling point contacts connected to a given line conductor. Coupling point contacts connected to one and the same column conductor are simultaneously actuated only when they jointly serve in maintaining a given telephone connection.

Instead of providing cyclic storers serving for the control of coupling point contacts disposed along a line conductor, there may also be provided cyclic storers serving for the control of coupling point contacts arranged along a column conductor. In such a case, care must be taken to avoid simultaneous closure of coupling point contacts connected to the same line conductor but extending to different column conductors.

The coupling point contacts arranged in the coupling multiple are, in view of the relatively high switching frequence with which they must operate, advantageously realized by electronic contacts such as are also used for the call switches provided in the various communication systems. Details concerning such switches are contained, for example, in the copending application Serial No. 108,330, filed May 8, 1961, now Patent No. 3,271,521, which is owned by the assignee also named in the present case.

Changes may be made within the scope and spirit of the appended claims which define what is believed to be new and desired to have protected by Letters Patent.

I claim:

1. A circuit arrangement over which is conducted the traffic of a plurality of time multiplex telephone systems each of which is provided with a call multiplex line serving for calls in which connections are built up in a direction incoming to subscriber stations and a call multiplex line serving for calls in which connections are built up in a direction outgoing from subscriber stations, wherein the subscriber stations of the systems are in given cases of calls periodically impulse-wise connected with the respective call multiplex lines; said circuit arrangement being constructed in the manner of a coupling multiple comprising line conductors and column conductors disposed in crossing relationship therewith, individual call multiplex lines for outgoing and incoming calls being respectively individually connected to said line conductors, coupling point contacts disposed at the crossing points of said line and column conductors, whereby calls within and between the respective systems can be effected by interconnecting call multiplex lines for incoming and for outgoing calls over the respective column conductors, by the actuation of coupling point contacts connected with said line and column conductors, further column conductors disposed in crossing relationship only with line conductors connected with call multiplex lines for outgoing calls, said further column conductors being respectively connected with trunk lines leading to other exchanges, still further column conductors being provided which are disposed in crossing relationship only with line conductors connected with call multiplex lines for incoming calls, said last named still further column conductors being connected with multiplex lines of systems with trunk lines coming from other exchanges, whereby calls extending respectively to and coming from other exchanges can be effected by the actuation of coupling point contacts connected with the corresponding line conductors and column conductors.

2. A circuit arrangement according to claim 1, wherein time multiplex systems connected with exchange trunk lines are combined in pairs to form systems each provided with a multiplex line for outgoing calls and a multiplex line for incoming calls, each combined system being connected with exchange trunk lines for incoming or outgoing calls.

3. A circuit arrangement according to claim 2, wherein each combined system is provided with two multiplex lines and with cyclic storers respectively for serving outgoing or incoming calls, said cyclic storers cycling code signals representing addresses of switches which are to be impulse-wise closed, said signals constituting control commands for the periodic closure of said switches.

4. A circuit arrangement according to claim 1, comprising for each line conductor a cyclic storer in which are periodically cycled code signals serving as control commands for the actuation of coupling point contacts connected with the corresponding line conductor.

5. A circuit arrangement according to claim 1, comprising cyclic storers for predetermined column conductors in which are periodically cycled code signals serving as control commands for the actuation of coupling point contacts connected with the respective column conductors.

6. A circuit arrangement according to claim 5, wherein coupling point contacts connected with a column conductor are operatively simultaneously actuated only when they serve the same call.

References Cited by the Examiner

UNITED STATES PATENTS

| | | | |
|---|---|---|---|
| 2,968,696 | 1/1961 | Trousdale | 179—15 |
| 2,984,705 | 5/1961 | Harris | 179—15 |
| 3,049,593 | 8/1962 | Touraton et al. | 179—15 |
| 3,061,685 | 10/1962 | Peach | 179—15 |
| 3,088,998 | 5/1963 | Bergmann et al. | 179—15 |

DAVID G. REDINBAUGH, *Primary Examiner.*

T. G. KEOUGH, R. L. GRIFFIN, *Assistant Examiners.*